US006745465B1

(12) United States Patent
Shinogle et al.

(10) Patent No.: US 6,745,465 B1
(45) Date of Patent: Jun. 8, 2004

(54) METHOD FOR ASSEMBLING AN APPARATUS, SUCH AS A FUEL INJECTOR, USING SELECT FIT OF DIMENSIONAL CONTROL FEATURES

(75) Inventors: Ronald Dean Shinogle, Peoria, IL (US); Gregory G. Hafner, Normal, IL (US)

(73) Assignee: Caterpillar Inc, Peoria, IL (US)

( * ) Notice: Subject to any disclaimer, the term of this patent is extended or adjusted under 35 U.S.C. 154(b) by 1,826 days.

(21) Appl. No.: 08/241,252

(22) Filed: May 11, 1994

(51) Int. Cl.[7] ............................................ B23P 15/00
(52) U.S. Cl. .................................... 29/888.01; 29/428
(58) Field of Search ............................ 29/858.01, 407, 29/428; 60/740–742; 137/855; 239/400, 402, 405, 406, 464

(56) References Cited

U.S. PATENT DOCUMENTS 2,642,047 A * 6/1953 Johnson .................. 29/888.01
4,601,086 A * 7/1986 Gerlach .................. 29/888.01
4,831,700 A * 5/1989 Halvorsen et al. ....... 29/888.01
4,843,697 A * 7/1989 Marshall .................. 29/888.01

* cited by examiner

*Primary Examiner*—I Cuda Rosenbaum
(74) *Attorney, Agent, or Firm*—John J Cheek; Dykema Gossett, PLLC

(57) ABSTRACT

A method of assembling an apparatus such as a fuel injector (200) wherein parts or components are selected based on their capacity to compensate for variations in timing and delivery contributed by the tolerance variations of components assembled or measured for assembly prior to the selected components. The method involves an apparatus such as an injector of the type including a set of input parameters, a set of control parameters, and a set of observed performance parameters wherein the method includes the steps of performing tests (214, 216, 218, 220) on the injector (14) to measure the values of the input parameters and determining the values of the set of control parameters (222) using the set of input parameters to reduce performance parameter variability of the final assembly. The method also includes the steps of selecting (232, 234), for each control parameter, the component associated therewith and, assembling the selected components into the injector (14).

36 Claims, 6 Drawing Sheets

METHOD FOR ASSEMBLING AN APPARATUS, SUCH AS A FUEL INJECTOR, USING SELECT FIT OF DIMENSIONAL CONTROL FEATURES

TECHNICAL FIELD

The present invention relates generally to a method of assembling an apparatus and, more particularly, to a method of assembling fuel injectors.

BACKGROUND ART

The advent of the unit fuel injector addressed a basic problem encountered by the prior art; namely, runs of separate high-pressure fuel lines from a fuel pressurization means to an injection nozzle. The unit injector solved this problem by incorporating the high pressure fuel pump and the injection nozzle into a single unit. The unit injector must be capable of carrying highly-pressurized fuel. Moreover, the unit injector must also be capable of operation at very high cycle rates. Therefore, to control performance parameters such as the timing of the fuel injection and the delivery characteristics of the fuel injection with the needed level of precision, the parts of the unit fuel injector had to be manufactured and assembled with extremely precise tolerances.

Early attempts at controlling the performance variability associated with dimensional tolerance variation involved a post-assembly adjustment of preselected mechanical components in the injector. However, this solution was not entirely satisfactory due to the variability of the adjustment itself. A later approach to this manufacturing problem involved what is now known as the select fit process. This process recognized that the dimensional tolerances associated with the components involved in the manufacture of a unit fuel injector are so exacting that all the components cannot be machined closely enough to the nominal target dimension to be interchangeable in the assembly process. The select fit process, therefore, measures each component individually. Then it is determined which components can be used together to meet the dimensional tolerance requirements. It was recognized, however, that even with the use of the select fit process, a completely assembled injector exhibited timing, quantity and delivery variations that were higher than was acceptable to achieve performance and emissions goals.

The present invention is directed to overcoming one or more of the problems as set forth above.

DISCLOSURE OF THE INVENTION

According to one aspect of the present invention, a method is provided for assembling an apparatus of the type including a set of one or more input parameters, a set of one or more control parameters, and a set of one or more observed resultant parameters. The method comprises the steps of assembling a preselected number of components into the apparatus, performing tests on the apparatus subassembly to measure the values of the set of input parameters, determining one or more cumulative variation parameters using the set of input parameters for the assembled preselected number of components, determining the values of the set of control parameters using the set of cumulative variation parameters to compensate for the cumulative variation of the set of observed performance parameters exhibited for the preselected number of components, selecting, for each control parameter, a respectively associated component having an actual characteristic substantially equal to a respective desired characteristic wherein the respective desired characteristic is a function of the determined control parameter value, and assembling the selected component into the apparatus.

According to another aspect of the present invention, a method is provided for assembling a fuel injector of the type including a set of input parameters comprising nozzle steady flow, a set of control parameters comprising poppet lift and air gap, and a set of observed performance parameters comprising timing and delivery. The method comprises the steps of assembling a preselected number of components into the injector, performing tests on the injector subassembly to measure the values of the set of input parameters, including nozzle steady flow, determining, for both timing and delivery, a cumulative variation parameter using the set of input parameters for the assembled preselected number of components, determining the values of the set of control parameters, including poppet lift and air gap, to compensate for the cumulative timing and delivery variation exhibited for the preselected number of components, selecting, for each control parameter including poppet lift and air gap, a respectively associated component comprising a poppet lift shim and an armature having an actual dimension substantially equal to a respective desired dimension wherein the respective desired dimension is a function of the determined control parameter value, and assembling the selected component into the fuel injector.

According to another aspect of the present invention, a method is provided for assembling a fuel injector which includes a plurality of components, each component having an actual dimension, the injector being of the type including a preselected set of observed performance parameters comprising injection timing and delivery, a plurality of control parameters wherein changes in each control parameter value are effective to vary, by a predetermined amount, the value of each observed performance parameter, and wherein changes in the actual dimension of each component are effective to vary the respectively associated control parameter value. The method comprises identifying those control parameters for which the respective predetermined amounts are relatively large and for which the component associated with the identified control parameter is assembled relatively near the end of the assembly process, selecting, for each identified control parameter including poppet lift and air gap, components whose actual dimension is sufficient to reduce end of line timing and delay variation, and assembling the selected components into the fuel injector.

The present invention provides a method of assembling a fuel injector to reduce the injection timing and delivery variation of the final assembled injector, as required to meet emissions and performance goals by compensating for the fuel injection timing and delivery variation caused by, for example, the dimensional tolerance variations of certain components without affecting other performance parameters.

BEST MODE FOR CARRYING OUT THE INVENTION

Figure 1:
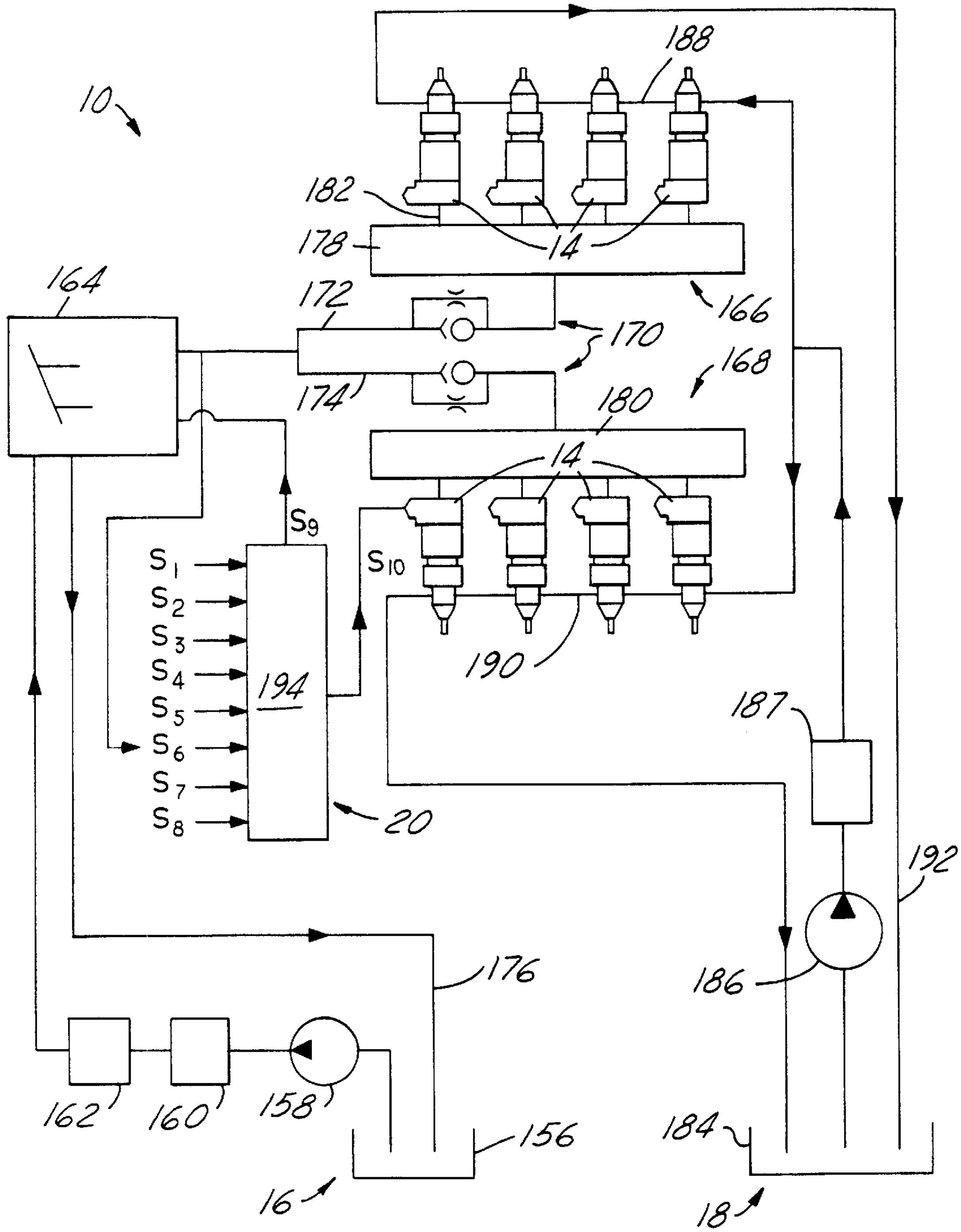
FIG. 1 is a combined block and diagrammatic view of a hydraulically-actuated electronically-controlled injector fuel system.
Figure 2:
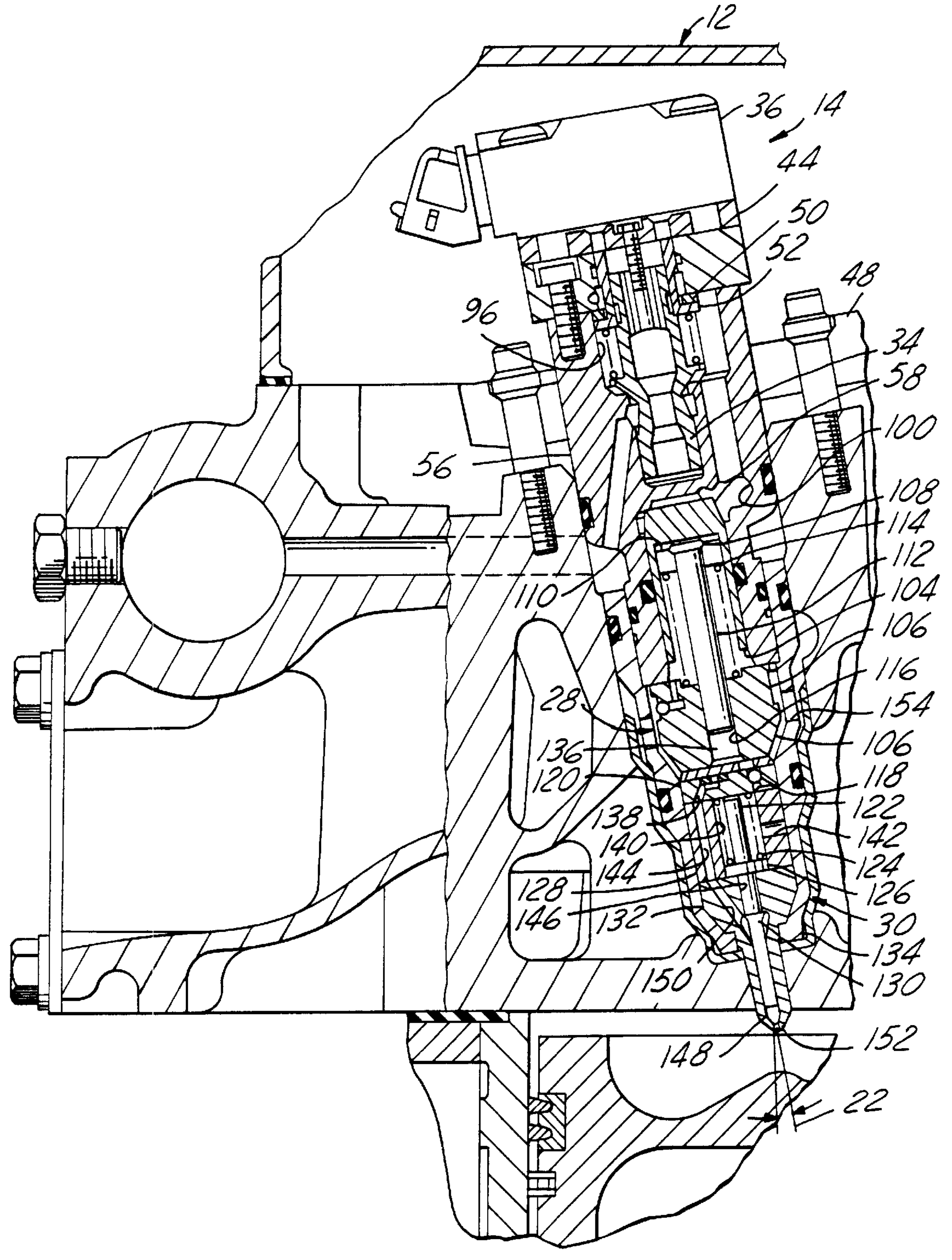
FIG. 2 is a fragmentary, cross-sectional view showing the fuel injector of FIG. 1 installed in an internal combustion engine.

Referring now to the drawings wherein like reference numerals are used to reference identical components in various views, FIG. 1 shows a hydraulically-actuated electronically-controlled fuel injection system 10 (HEUI fuel system) utilizing a plurality of hydraulically-actuated electronically-controlled fuel injectors assembled in accordance with the method of the present invention. Fuel injection system 10 is preferably adapted for use in a diesel-cycle direct-injection internal combustion engine 12, as shown in FIG. 2. Although a V-8 cylinder engine is indicated in FIG. 1, it should be understood that the fuel injector of the present invention can also be used in other types of engines.

Referring to both FIGS. 1 and 2, HEUI fuel injection system 10 includes at least one injector 14 adapted to be installed in engine 12, means 16 for supplying hydraulically actuating fluid to each injector 14, means 18 for supplying fuel to each injector 14, and means 20 for electronically controlling the HEUI fuel system 10. In the embodiment of FIG. 1, the injector 14 is a unit injector. Alternatively, the injector may be non-unitized for certain applications.

Figure 3:
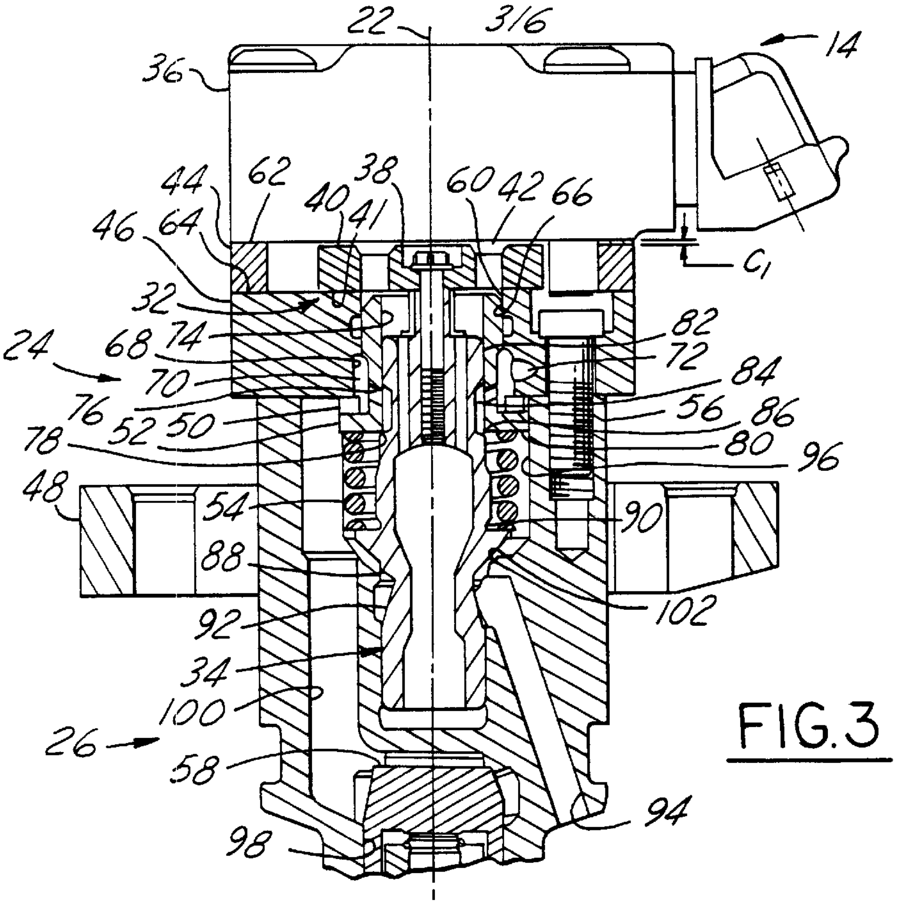
FIG. 3 is an enlarged fragmentary view, taken in section, of an upper portion of the fuel injector shown in FIG. 2.
Figure 4:
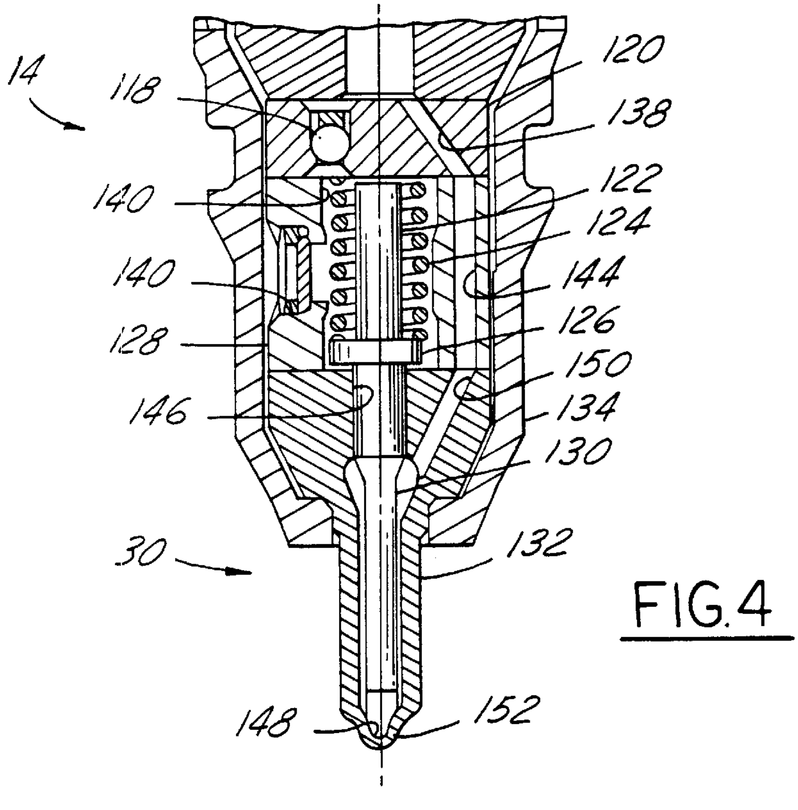
FIG. 4 is an enlarged fragmentary view, taken in section, of a lower portion of the fuel injector shown in FIG. 2.

As best seen in FIGS. 2–4, each injector 14 has a longitudinal axis 22 and includes an actuator and valve assembly 24, a body assembly 26, a barrel assembly 28, and a nozzle and tip assembly 30.

Figure 7:
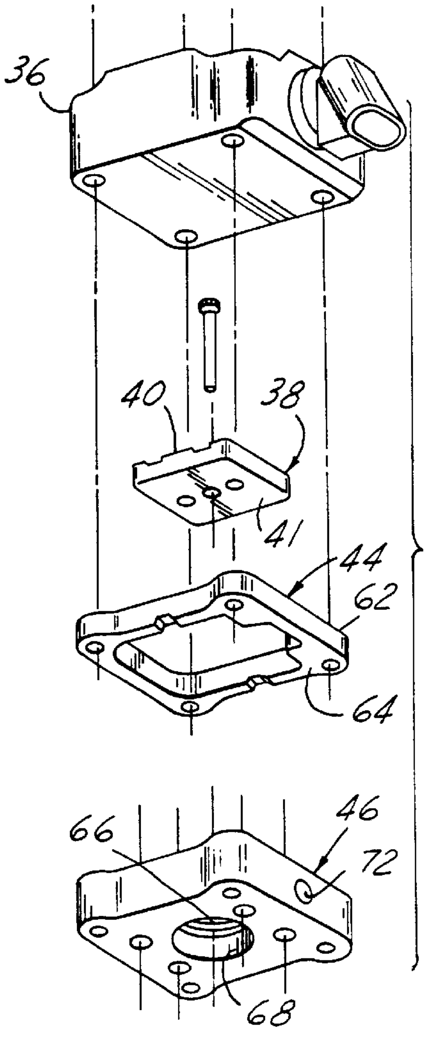
FIG. 7 is an exploded perspective view of a third portion of components as shown in the fuel injector of FIG. 2.

The actuator and valve assembly 24 provides a means for selectively communicating relatively high pressure actuating fluid to each injector 14 in response to control signal $S_{10}$. Actuator and valve assembly 24 includes solenoid assembly 32, and poppet valve 34 (FIGS. 3 and 7). Solenoid assembly 32 includes a fixed stator 36 and a movable armature 38 connected to the poppet valve 34. Armature 38 has a pair of oppositely-facing planar first and second surfaces 40, 41. The first surface 40 of armature 38 is spaced from stator 36 such that armature 38 and stator 36 collectively define an upper armature cavity 42 or gap therebetween.

As shown in FIG. 3, a closely controlled axial clearance or gap $C_1$ is defined between armature 38 and stator 36 when armature 38 is in an electrically de-energized state. The clearance $C_1$ defines part of the upper armature cavity 42, and also determines the amount of magnetic force applied by fixed stator 36 to movable armature 38 when the solenoid assembly 32 is in an electrically energized state. The air gap is a significant design factor because the force applied by fixed stator to movable armature 38 determines how quickly movable armature 38 moves axially upward when solenoid assembly 32 is electrically energized.

As best seen in FIG. 3, body assembly 26 includes an annular armature spacer 44, a poppet adapter 46, an annular injector clamp 48, a poppet lift shim 50, a poppet sleeve or member 52, a poppet spring 54, a piston and valve body 56, and an intensifier piston 58 (FIGS. 3 and 7). The armature spacer 44 has a longitudinal thickness that is greater than the longitudinal thickness of armature 38 by a preselected amount. The second planar surface 41 of armature 38 is spaced from poppet adapter 46 so that armature 38 and poppet adapter 46 collectively define a lower armature cavity or gap 60 therebetween. The armature spacer 44 has a pair of oppositely-facing planar first and second surfaces 62, 64. The first planar surface 62 of armature spacer 44 faces and directly contacts stator 36. The second planar surface 64 of spacer 44 faces and directly contacts poppet adapter 46.

As shown in FIGS. 3 and 7, poppet adapter 46 has a longitudinally-extending centrally-disposed main bore 66 formed therethrough. The poppet adapter 46 also has a counter bore 68 formed on one end portion of main bore 66. An annular drain passage 70 is defined between poppet sleeve 52 and counter bore 68 of poppet adapter 46. The poppet adapter 46 also has a drain passage 72 defined therein which intersects annular drain passage 70 and extends outwardly to an outer surface of poppet adapter 46. Preferably, the actuating fluid used in injector 14 is chosen to be engine lubricating oil. In this case, drain passage 72 is preferably adapted to communicate with an actuating fluid sump 156 such as an engine oil pan. Thus, actuating fluid in communication with annular drain passage 70 and drain passage 72 is permitted to drain back to that sump 156.

As may be seen in FIG. 3, poppet lift shim 50 is located between poppet adapter 46 and poppet sleeve 52. The poppet lift shim 50 has a selected thickness which determines the amount of upward lift for displacement of poppet valve 34. The significance of this selected thickness will become apparent later in this description.

Figure 6:
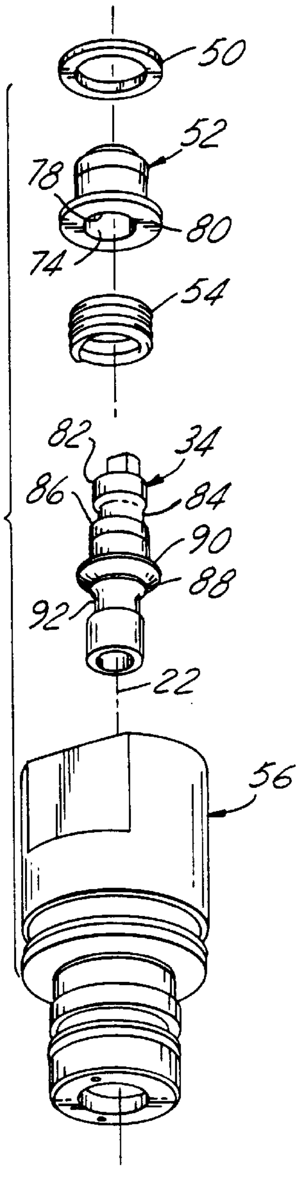
FIG. 6 is an exploded perspective view of a second portion of components as shown in the fuel injector of FIG. 2.

Referring now to FIGS. 3 and 6, poppet sleeve 52 is slidably positioned in main bore 66 of poppet adapter 46. The poppet sleeve includes a centrally-disposed main bore 74 and at least one (preferably two) laterally extending passages 76 that communicate actuating fluid between annular drain passage 70 and main bore 74. The poppet sleeve 52 has one end portion which defines an annular, and preferably frusto-conical, seat 78 around an entrance to main bore 74 and an annular shoulder 80.

One end of poppet spring 54 contacts poppet valve 34 and the other end of poppet spring 54 contacts annular shoulder 80 of poppet sleeve 52. The poppet spring 54 is preferably a helical compression spring and biases poppet valve 34 and movable armature 38 longitudinally away from fixed stator 36. The poppet spring 54 also biases poppet sleeve 52 and poppet lift shim 50 against poppet adapter 46 so that poppet valve 34 is normally unseated from annular seat 78.

Poppet valve 34 includes annular peripheral surface 82, upper annular peripheral groove 84, annular first or upper seat 86, annular second or lower seat 88, annular peripheral shoulder 90, and lower annular peripheral groove 92. The annular peripheral surface 82 of poppet valve 34 is positioned within main bore 74 of poppet sleeve 52 according to a preselected annular clearance $C_2$, defined as the poppet valve 34 outside diameter (annular peripheral surface 82 diameter) to poppet sleeve 52 inside diameter clearance.

This poppet-to-sleeve clearance provides a slip fit between poppet valve 34 and poppet sleeve 52. The dimension $C_2$ is also a significant dimension in injector 14 as it has a relatively large impact on observed performance parameters of injector 14, such as timing and delivery of the fuel injected. As shown in FIG. 3, actuating fluid is communicated to lower and upper armature gaps 60 and 42 by way of the poppet-to-sleeve clearance when poppet valve 34 is in its second position to be described below. The communication of the actuating fluid as poppet valve 34 moves between the first and third positions serves to dampen the motion of poppet valve 34. The full significance of clearance dimension $C_2$ will become apparent later in this description.

Upper annular peripheral groove 84 and annular upper seat 86 are defined on annular peripheral surface 82 of poppet valve 34. The upper seat 86 is adapted to selectively engage or disengage annular seat 78 formed on poppet sleeve 52. The annular lower seat 88 provides a means for selectively opening the communication of high pressure actuating fluid to intensifier piston 58. The upper annular seat 86 provides a means for selectively opening the communication of high pressure actuating fluid to a lower pressure drain (i.e., the actuating fluid sump 156).

The poppet valve 34 is movable between first, second, and third positions. The first position of poppet valve 34 is defined as the position at which lower seat 88 of poppet valve 34 is normally seated on body 56 due to the bias of poppet spring 54 upon annular peripheral shoulder 90. At this first position of poppet valve 34, upper seat 86 is normally unseated from annular seat 78 of poppet sleeve 52 by a preselected clearance. The first position corresponds to a state when solenoid assembly 32 is electrically de-energized.

When solenoid assembly 32 is electrically energized, armature 38 is magnetically attracted towards stator 36 so that poppet valve 34 moves with armature 38 axially upward towards a third position. The third position of poppet valve 34 is defined as the position at which the upper seat 86 of poppet valve 34 is seated against annular seat 78 of poppet sleeve 52. When in this third position, annular lower seat 88 is unseated from body 56.

Between the above-mentioned first and third positions, poppet valve 34 moves through a second position at which both annular lower seat 88 and annular upper seat 86 of poppet valve 34 are unseated from body 56 and poppet sleeve 52, respectively. When poppet valve 34 is in the second position, actuating fluid is exhausted through upper annular peripheral groove 84, laterally extending passages 76, and drain passage 72, thereby creating an actuating fluid path to actuating fluid sump 156.

The total axial displacement of poppet valve 34 may be, for example, nominally 250 microns (approximately 0.0098425 inches), as measured along axis 22. Total travel of poppet valve 34 from the first position to the third position defines poppet lift or simply lift. This dimension has a significant impact on the observed performance parameters, timing and delivery, of a completely assembled injector 14. The purpose of this dimension in the present invention will become apparent later.

As shown in FIGS. 2 and 3, body 56 includes an actuating fluid inlet passage 94, a pair of oppositely-facing first and second blind bores 96, 98, an actuating fluid intermediate passage 100 communicating between first and second blind bores 96, 98, and an annular seat 102. The seat 102 of body 56 is adapted to selectively engage and disengage annular lower seat 88 of poppet valve 34. The second blind bore 98 of body 56 is adapted to receive barrel assembly 28.

As best seen in FIG. 2, intensifier piston 58 is slidably positioned in second blind bore 98 of body 56. The intensifier piston 58 is a generally cup-shaped cylinder having an outside diameter $D_1$ which corresponds to an effective cross-sectional pumping area $A_1$. The intensifier piston 58 also has a stop 104 formed thereon. The stop 104 is preferably located on the lower free end of piston 58 and is adapted to engage barrel assembly 28. Barrel assembly 28 includes a barrel 106, a ring retainer 108, a washer retainer 110, a plunger 112, and a plunger spring 114. The barrel 106 includes a centrally—disposed longitudinally-extending main bore 116.

The plunger 112 is slidably positioned in main bore 116 of barrel 106 by close tolerance fit. The washer retainer 110 is connected to plunger 112 by an interference fit. Washer retainer 110 is fixed to plunger 112 by ring retainer 108. The plunger 112 has a diameter $D_2$ which corresponds to an effective cross-sectional pumping area of $A_2$. The diameter $D_1$ of intensifier piston 58 is larger than the diameter $D_2$ by a preselected amount. For example, the ratio of area $A_1$ to area $A_2$ may be about 7 to 1. The plunger spring 114 is positioned generally concentrically around plunger 112 between barrel 106 and washer retainer 110. The plunger spring 114 is preferably a helical compression spring which biases plunger 112 and intensifier piston 56 upwardly against body 56.

As shown in FIG. 4, nozzle and tip assembly 30 includes a one-way flow check valve 118 preferably in the form of a ball check, a stop member 120, a stop pin 122, a needle check spring 124, a lift spacer 126, a sleeve 128, an axially movable needle check or valve 130, a needle check tip 132, and a case 134.

Figure 5:
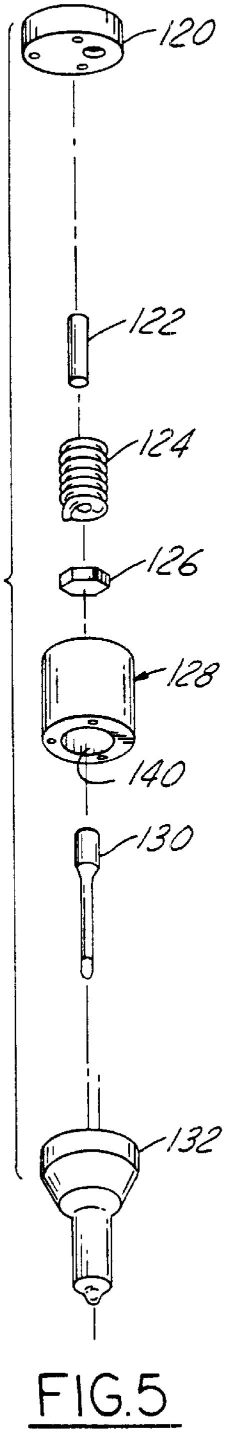
FIG. 5 is an exploded perspective view of a first portion of components as shown in the fuel injector of FIG. 2.

Referring also to FIG. 5, the stop member 120 is axially positioned between barrel 106 and sleeve 128. The stop member 120, barrel 106 and plunger 112 collectively define a fuel pump chamber 136. The stop member 120 also includes a fuel discharge passage 138. The discharge passage 138 communicates with fuel pump chamber 136.

Sleeve 128 is axially positioned between stop member 120 and needle check tip 132. The sleeve 128 has a centrally disposed and longitudinally-extending bore 140, and a fuel inlet passage 142 which communicates with bore 140, and fuel discharge passage 144 which communicates with fuel discharge passage 138 of stop member 120.

Lift spacer 126 is axially positioned between stop pin 122 and needle check or valve 130. The needle check spring 124 is positioned around stop pin 122. The stop pin 122, needle check spring 124, and lift spacer 126 are positioned in the sleeve bore 140 so that the needle check spring 124 is preloaded and contacts both stop member 120 and lift spacer 126.

The needle check tip 132 is positioned between sleeve 128 and case 134. As best seen in FIG. 2, needle check tip 132 includes a blind bore 146 having an internally-disposed annular seat 148, discharge passage 150, and at least one, and preferably a plurality of fuel injection spray orifices 152. The needle check spring 124 normally biases the lift spacer 126 and needle check 130 downwardly so that needle check 130 is seated against annular seat 148 of needle check tip 132.

Case 134 includes a fuel inlet passage in the form of one or more radially-extending fuel inlet holes 154. The fuel holes 154 communicate with fuel inlet 142 by a clearance between an inside wall of case 134 and an outer peripheral surface of barrel 106, stop member 120 and sleeve 128. The case 134 encloses and retains needle check tip 132, needle check 130, sleeve 128, stop member 120, barrel 106, plunger 112, plunger spring 114, and intensifier piston 58 of body 56.

Referring now to FIG. 1, the means 16 for supplying hydraulically actuating fluid includes an actuating fluid sump 156, an actuating fluid transfer pump 158, an actuating fluid cooler 160, an actuating fluid filter 162, a relatively high-pressure actuating fluid pump 164, first and second high pressure actuating fluid manifold 166, 168, and means 170 for controlling the creation of Helmholtz resonance of pressure waves between the manifolds 166, 168.

Preferably, the fluid chosen for the actuating fluid is engine lubricating oil. In this case, the actuating fluid sump 156 is the engine lubrication oil pan. The transfer pump 158 is of a conventional design. The filter 162 is preferably of the replaceable element type. Alternatively, the actuating fluid may be fuel.

The high pressure pump 164 may be a fixed displacement axial piston pump which is mechanically driven by engine 12. The outlet of the high pressure pump 164 communicates with first and second manifold passages 172 and 174. Each of the first and second manifold supply passages 172, 174 communicates with a respective manifold 166, 168.

The outlet pressure of high pressure actuating pump 164 may be varied. When varied, a pressure regulating means of pump 164 directs excess actuating fluid through return line 176 to actuating fluid sump 156. Each actuating fluid manifold 166, 168 has one common rail passage 178, 180 and a plurality of rail branch passages 182 communicating with common rail passages 178, 180. Means for supplying fuel 18 includes a fuel tank 184, a fuel transfer and priming pump 186, a fuel filter 187, a fuel manifold 188, 190 provided for and associated with each bank of cylinders or combustion chambers, and a return line 192.

Electronic controlling means 20 includes a programmable electronic control module 194 and a means for detecting at least one parameter and generating a parameter indicative signal ($S_{1\text{-}5,\ 7\text{-}8}$), hereafter referred to as an input data signal which is indicative of the parameter detected. The electronic control module 194 is programmed with multi-dimensional control strategies or logic maps which take into account the above-mentioned input data signals to compute a pair of desired output control signals $S_9$, $S_{10}$. One output control signal $S_9$ is the actuating fluid manifold pressure command signal. This signal is directed to relatively high-pressure actuating fluid pump 164 to adjust the output pressure of the pump 164 which in turn adjusts the pressure of the actuating fluid in manifold 166, 168 to a desired level. In order to accurately control the actuating fluid pressure, a sensor is provided for detecting the pressure of the hydraulically actuating fluid supplied to injector 14 to generate a pressure indicative signal $S_6$. The control module 194 compares the actual actuating fluid pressure with the desired pressure makes any necessary correction to output control signal $S_9$.

The other output control signal $S_{10}$ is the fuel delivery command signal which is supplied to solenoid assembly 32 of each HEUI 14. The fuel delivery command signal $S_{10}$ determines the time for starting fuel injection and the quantity of fuel injected during each injection phase or pulsewidth.

INDUSTRIAL APPLICABILITY

The operation of injector 14 will be described first, followed by a description of an inventive method of assembling injector 14.

As shown in FIG. 1, fuel is supplied to manifolds 188, 190 by fuel transfer pump 186 from fuel tank 184. Referring also to FIG. 2, fuel flows through fuel inlet holes 154 of injector 14 and unseats flow check valve 118 to fill fuel pump chamber 136. The poppet valve 34 is at its first position when solenoid assembly 32 is in its electrically de-energized state. As shown in FIG. 3, poppet valve 34 blocks communication between actuating fluid inlet passage 94 and actuating fluid intermediate passage 100. Actuating fluid intermediate passage 100 communicates with upper annular peripheral groove 84 which communicates through laterally extending passages 76 to drain passage 72 to sump 156. Since actuating fluid intermediate passage 100 is at relatively low pressure by virtue of being in communication with actuating fluid sump 156, plunger spring 114 biases and pushes upwardly against the plunger 112 and intensifier piston 58 until piston 58 abuts body 56.

To begin fuel injection, electronic control module 94 generates fuel delivery command signal $S_{10}$ to drive solenoid assembly 32 of fuel injector 14. The movable armature 38 is drawn to fixed stator 36. Poppet valve 34 moves with armature 38, and is thus also drawn towards stator 36. When poppet valve 34 reaches its third position, upper annular seat 86 abuts annular seat 78 of poppet sleeve 52, thus blocking communication between actuating fluid intermediate passage 100 and the actuating fluid sump. High pressure actuating fluid, admitted through actuating fluid inlet passage 94, and through lower annular peripheral groove 92, into actuating fluid intermediate passage 100, is communicated to intensifier piston 58, and therefore hydraulically exerts a driving force on the top of intensifier piston 58. The high pressure actuating fluid displaces intensifier piston 58 and plunger 112. The fuel in fuel pump chamber 136 is pressurized by the downward movement of plunger 112 to a level that is a function of the pressure of the actuating fluid exerting the downward force on intensifier piston 58 and the selected ratio of effective hydraulic working areas $A_1/A_2$ between intensifier piston 58 and plunger 112. This pressurized fuel flows, as shown in FIG. 4, from fuel pump chamber 136 through discharge passages 120, 144, and 150. The pressurized fuel acts on needle check 130 to lift needle check 130 after a selected value opening pressure level is reached, sufficient to overcome the preload force exerted by needle check spring 124. When the needle check 130 is lifted, the highly pressurized fuel is injected through injection spray orifices 152 into the respective combustion chamber of the engine.

To end or interrupt fuel injection, electronic control module 94 discontinues fuel delivery command signal $S_{10}$ to solenoid assembly 32. The absence of a magnetic force acting on armature 38 is effective to allow compressed poppet spring 54 to expand causing armature 38 and poppet valve 34 to move back to the first position. At the first position, lower annular seat 88 of poppet valve 34 abuts seat 102 of body 56, which blocks high pressure actuating fluid from entering actuating fluid intermediate passage 100. Since actuating fluid intermediate passage 100 is now in fluid communication with actuating fluid sump 156, the force of the compressed plunger spring 114 overcomes the relatively smaller force applied by the actuating fluid to the top of intensifier piston 58. The compressed plunger spring 114 expands to return plunger 112 and intensifier piston 58 to a position against body 56. The pressure in fuel pump chamber 136 also decreases such that compressed needle check spring 124 moves needle check 130 downwardly against annular seat 148 of needle check tip 132. The upwardly traveling plunger 112 allows inlet fuel to unseat check valve 118 to refill fuel pump chamber 136.

It will be understood that the time interval between the initial assertion of fuel delivery command signal $S_{10}$ by electronic control module 94 and the time when the fuel injection event starts (i.e., when fuel begins to flow through the plurality of spray orifices 152) is unique to each assembled injector 14. Although there exists a nominal delay period between the above-described events, it would be advantageous to reduce, to the greatest extent possible, the variation of this timing parameter from injector to injector and from each injector to a nominal value. Moreover, it will also be understood that for a given pulsewidth of fuel delivery command signal $S_{10}$, fuel injector 14 will deliver a predetermined nominal quantity of fuel, under rated conditions, per stroke of plunger 112. It is also desirable to reduce the variation of this fuel delivery parameter from injector to injector.

The method of assembly of the present invention therefore provides a set of observed performance parameters. Preferably, the set of observed performance parameters comprises observed timing, and observed delivery, as described in the foregoing paragraphs. Furthermore, the method of assembly of the present invention has, as one of its objects, to reduce completed assembly, or final build variability of these preselected observed performance parameters from injector build to injector build and from injector build to a nominal value. Variation is not an absolute term, but only takes on significance in comparison with a predetermined target value. Therefore, in order to judge the magnitude of the variability of any particular assembled injector 14, a set of corresponding target performance parameters is provided. Preferably, this set of target performance parameters also comprises timing and delivery as defined above. The values of these parameters are preferably preselected to be nominal design values. It should be appreciated by those of skill in the art that selection of nominal design values for the target performance parameters allows the method of the present invention to accomplish two objects: (1) reduce variation of the injectors as to each other, and (2) reduce variation of the injectors from the nominal design. For example, delivery variation may be eliminated as between each injector, but variation from nominal can nonetheless exist where all the injectors are either above or below the nominal design value, an undesirable situation. The method of this invention reduces both types of variation.

One of the distinguishing aspects of the method of assembly of the present invention lies in the fact that certain components or parts are selected for assembly into injector 14 for its capacity, based on a characteristic unique to that component (e.g., dimensional thickness, flow area, bias force, etc.), to reduce the variation of the timing and delivery parameters relative to target timing and delivery parameter values. Prior art select fit methods of assembly select the component to be assembled, based on its actual dimension, for its capacity to reduce a measured variation from a nominal target dimension, or, as it is sometimes referred to, select fit to nominal. Thus, although both the prior art and the present invention use part or component dimensions in their respective select fit process, prior art methods select fit to compensate only for dimensional variations while the present invention select fits to compensate for performance parameter variations as well as dimensional variations.

The method of assembly of the present invention reduces timing and delivery variations by first identifying features or parameters that most directly contribute to variations in timing and delivery (such as fuel injection, quantity, duration of injection, rate of injection, etc.). For instance, nozzle steady flow (i.e., the flow through nozzle tip 132) has been identified, for example, through model simulation and actual test data, to be one of the more significant contributors to variation in delivery. In contrast, certain other parameters, for example, the dimensional clearance between the outside diameter of plunger 112 and the inside diameter of main bore 116 of barrel 106, do not contribute as significantly to variations in timing and delivery. Once the most significant features are identified, those features are then further subdivided into a set of input parameters and a set of control parameters. The set of input parameters contain the measured values of certain of the features for purposes that will become apparent below. The set of control parameters contain certain of the features which are purposefully varied about a nominal value, by appropriate selection of components having a desired dimension, to compensate for variation in timing and delivery arising out of variation in the dimensions or characteristics of other components previously measured for assembly in the apparatus.

Preferably, the identified group of features includes, but is not limited to, nozzle steady flow, defined as the steady state fluid flow through fuel injection spray orifices 152, needle check or valve 130 opening pressure, as will be described below, poppet spring 54 preload or spring bias, poppet-to-sleeve clearance, as described in the preceding paragraphs, solenoid assembly 32 force, as applied by stator 36 to a test armature fixture, poppet valve lift and air gap. Poppet valve lift has been described in the preceding paragraphs and is defined as the travel, along longitudinal axis 22, of poppet valve 34 from the first position wherein lower seat 88 abuts seat 102 of body 56 and the third position wherein upper seat 86 abuts seat 78 of poppet sleeve 52. Air gap has been described above and is defined as the axial distance along longitudinal axis 22 from first planar surface 40 of armature 38 to stator 36.

Although all of the above-mentioned features are interchangeable to the extent that they are significant contributors to variations in timing and delivery, not all of these features lend themselves equally to being used as control parameters. In the illustrative embodiment, there are a plurality of factors that determine whether one of the features is to be identified as a control parameter. It should be understood that variation of one of these features does not necessarily result only from the variation in the dimension or characteristic of one component. For example, the air gap parameter may be varied by adjusting the thickness of armature 38, or alternatively, by adjusting the thickness of armature spacer 44, or alternatively by adjusting both thicknesses. The present invention provides each of the features with an associated set of components which, when dimensionally varied, affect the value of the respective feature. One of the factors that determine when a feature is identified as a control parameter is whether the associated component or components are assembled relatively late in or near the end of the assembly process. The later in the assembly process a component is assembled, the fewer components remain to be assembled after, and correspondingly, fewer components that can introduce performance parameter variation. This factor applies primarily where dimensional stack-up variations are concerned; where a component does not introduce a dimensional variation (e.g., the solenoid varies in terms of force), this factor is less important. Another factor is whether the characteristic or dimension of the component to be selected is easy to control. For example, the thickness of a lift shim is a single dimensional characteristic and is relatively easy to control, whereas the nozzle steady flow parameter, due in part to the variability of the plurality of fuel injection spray orifices 152, the needle check lift, and how well the needle check and tip geometries correspond, is relatively difficult to control. Finally, some of the components associated with each of the features are relatively inexpensive when compared to other of the associated components. For example, poppet lift shim 50 is relatively inexpensive, as compared to needle check tip 132, which comprises fuel injection spray orifices 152. It should be understood that the nature of the associated component significantly influences the selection of that feature as a control parameter.

In light of the foregoing, the method of assembly of the present invention preferably provides a set of input parameters comprising nozzle steady flow, needle check or valve 130 opening pressure, poppet spring 54 preload or spring bias, poppet-to-sleeve clearance, and stator 36 force, and further provides a set of control parameters comprising poppet lift and air gap. The associated component used to vary lift and air gap comprising, respectively, poppet lift shim 50 and armature 38.

The method of the present invention departs from the prior art in that certain of the assembled components are selected, based on the component's actual characteristic or dimension, to compensate for cumulative variations in timing and delivery that arise out of variations (dimensional and otherwise) of components previously measured for assembly. Optimal values for poppet lift and air gap, the control parameters, are determined using input parameters nozzle steady flow, valve opening pressure, poppet preload, poppet-to-sleeve clearance and solenoid assembly 32 force. Assuming that a fuel injection timing variation of the final assembled injector 14 is desired to be zero, the following equation associated with the timing control parameter can be derived.

$$SOI+T_L R_L+T_{AG} R_{AG}=0$$

With a similar assumption regarding fuel injection delivery variation, the following equation associated with the delivery control parameter can also be derived.

$$DEL+k_L R_L+k_{AG} R_{AG}=0$$

In both equations, the following definitions apply:

SOI equals the sum of fuel injection timing variation caused by measured input injector parameter features, $T_L$ equals timing sensitivity of lift, $R_L$ equals recommended lift, $T_{AG}$ equals timing sensitivity of air gap, $R_{AG}$ equals recommended air gap, DEL equals the sum of fuel injection delivery variation caused by measured input injector parameter features, $k_L$ equals delivery sensitivity of lift, $k_{AG}$ equals delivery sensitivity of air gap.

It will be understood that there are two equations and two unknowns (i.e., recommended lift and recommended air gap. Solving these two equations simultaneously yields $$R_L=\frac{T_{AG}DEL-k_{AG}SOI}{T_L k_{AG}-T_{AG}k_L}$$

and $$R_{AG}=\frac{k_L SOI-T_L DEL}{T_L k_{AG}-T_{AG}k_L}.$$

The sum of delivery variation term, DEL, is determined as the sum of the individual contributions to overall timing and delivery variations for each of the input parameters nozzle steady flow, valve opening pressure, poppet preload, poppet-to-sleeve clearance and solenoid force. In a similar fashion, the sum of timing variation term, SOI, is determined as the sum of the individual contributions to overall timing variation by each of the measured input parameters nozzle steady flow, valve opening pressure, poppet preload, poppet-to-sleeve clearance and solenoid force. Thus, SOI and DEL correspond to the cumulative variation of timing and delivery for the previously assembled or measured components. Each of the sensitivity factors define a relative change in one of the performance parameters, timing or delivery, to changes in one of the control parameters, lift or air gap. To illustrate, incremental changes in the dimension of poppet lift vary, by a predetermined amount, the overall timing of injector 14; the predetermined relationship is denoted $T_L$. SOI and DEL are therefore intermediate constants or parameters that respectively correspond to timing and delivery performance parameters, and collectively define a set of cumulative variation parameters.

It should be appreciated that there are other methods of solving N equations in N variables. Further, the present invention is not limited to these cases. For example, there may be 2 equations, one associated with each performance parameter, in three unknowns, or control parameters. This situation yields a range of solutions. The values of each of the control parameters may then be selected based on other criteria (e.g., closeness to nominal dimension).

Figure 8:
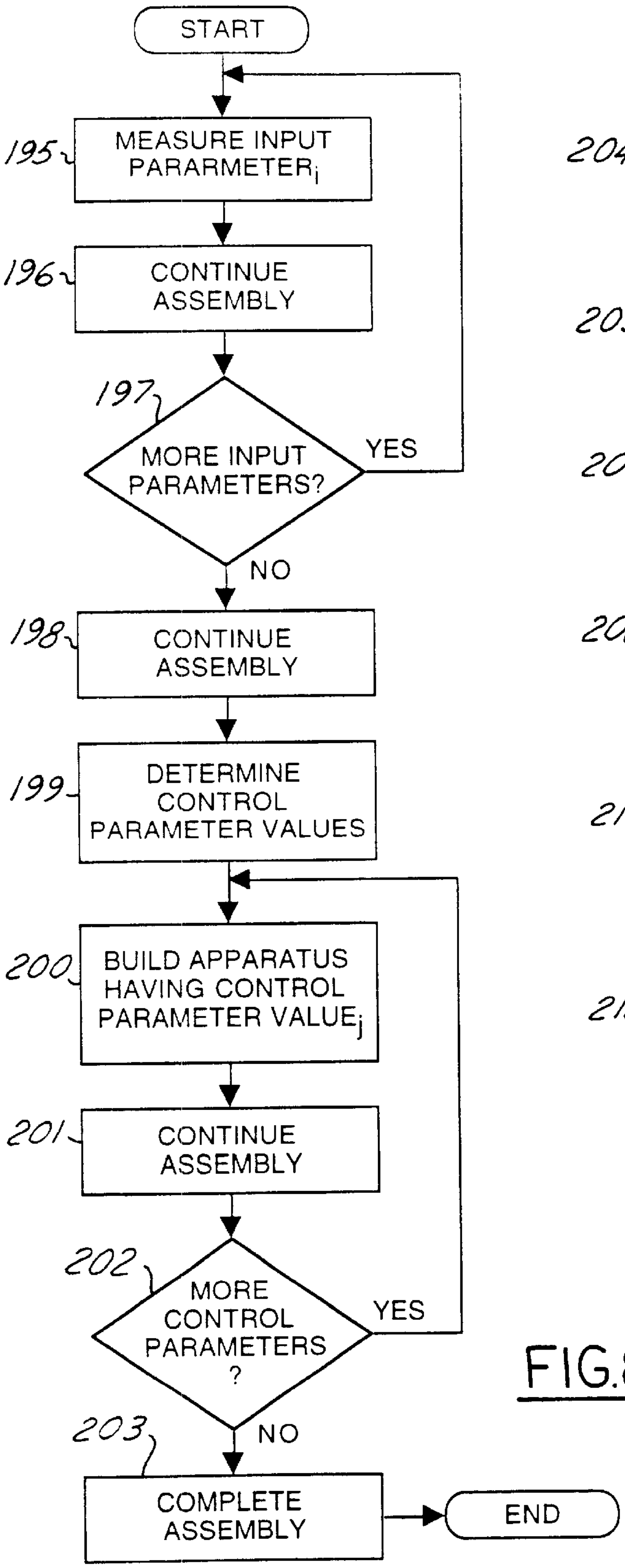
FIG. 8 is a flowchart depicting the general method steps of the present invention.

The steps of the method of assembly of the present invention will now be described. The flow chart shown in FIG. 8 depicts the general steps comprising the inventive method of assembling an apparatus such as injector 14. The method of the present invention begins in a start or begin state. In step 195, a first one of i input parameters are measured. Note that this invention does not require any assembly prior to measurement of the first input parameter. Thus, for example, components that do not vary substantially in terms of dimension, but vary in other ways (e.g., the force of solenoid assembly 32), the characteristic may be measured as an input parameter prior to any assembly. In step 196, assembly of the apparatus is continued, if required, so that the next input parameter may be measured. In step 197, a test is performed to determine whether there are any more input parameters to be measured. If the answer to this test is "YES", control of the flow is returned to step 195 where the next one of the i input parameters are measured. If the test in step 197 is answered "NO" then control of the method continues to step 198. In step 198, assembly is continued, if required. In step 199, the control parameter values are determined using the measured input parameters, as measured in step 195. The flow continues to step 200, where the apparatus is built or assembled such that a first one of the j control parameters has a value substantially equal to a respective determined control parameter value as determined in step 199. It should be understood that step 200 may be performed by selecting premeasured components to obtain the determined control parameter value, machining in-line a component as required such that the control parameter is substantially equal to the determined value, or otherwise manufacturing (e.g., varying the number of turns on a solenoid), such that the determined control parameter value is achieved. The flow of the method of the present invention continues to step 201, where assembly of the apparatus is continued, if required in order to build an apparatus in accordance with the next control parameter value, if any. The flow continues to step 202, where a test is performed to determine whether there are any other control parameters left to be built into the apparatus. If the answer to the test in step 202 is "YES" then control is returned to step 200. Otherwise, if there are no more control parameters left to be assembly or built into the apparatus, control flows to step 203, where the assembly of the apparatus is completed, wherein the method of assembling the apparatus ends.

Figure 9:
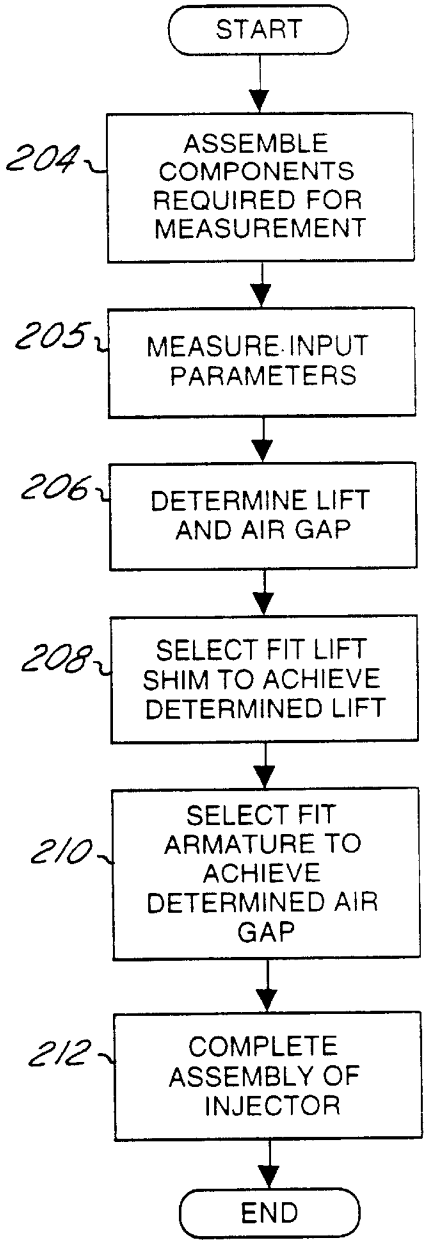
FIG. 9 is a flow chart depicting an embodiment of the steps of the method of the present invention.

Referring now to FIG. 9, the steps 204–206, 208, 210 and 212 roughly correspond to and show in greater detail the general method steps of the present invention as shown in FIG. 8 for a preferred embodiment. In step 204, the components required for measurement are assembled into the fuel injector 14. In step 205, the input parameters are measured. It should be appreciated that, for example, measurement of the solenoid assembly 32 force requires no preassembly of components in order to perform the input parameter measurement step (step 205). Likewise, it should be appreciated that measurement of an input parameter such as the needle check valve opening pressure can only be measured after first assembling a preselected number of components. After the input parameters have been measured in step 205, the control parameters, lift and air gap, are determined in step 206 using the foregoing equations.

In step 208, poppet lift shim 50 is selected by the select fit method of the present invention. As will be discussed below, the dimension of shim 50 is selected to compensate for the cumulative variation of timing and delivery introduced by the tolerance variation of the components assembled and/or measured for assembly (i.e., the solenoid force measurement) up until this point in the subassembly.

In step 210, armature 38 is also selected by the method of the present invention. As will be discussed below, the dimension of armature 38 (as was the case with shim 50 in step 208) is selected to compensate for the cumulative variation introduced by the previously assembled or measured components. In step 212, the selected components from steps 208, and 210, along with the remaining components associated with injector 14, are assembled. At this point, the assembly process is complete or at an end.

Figure 10:
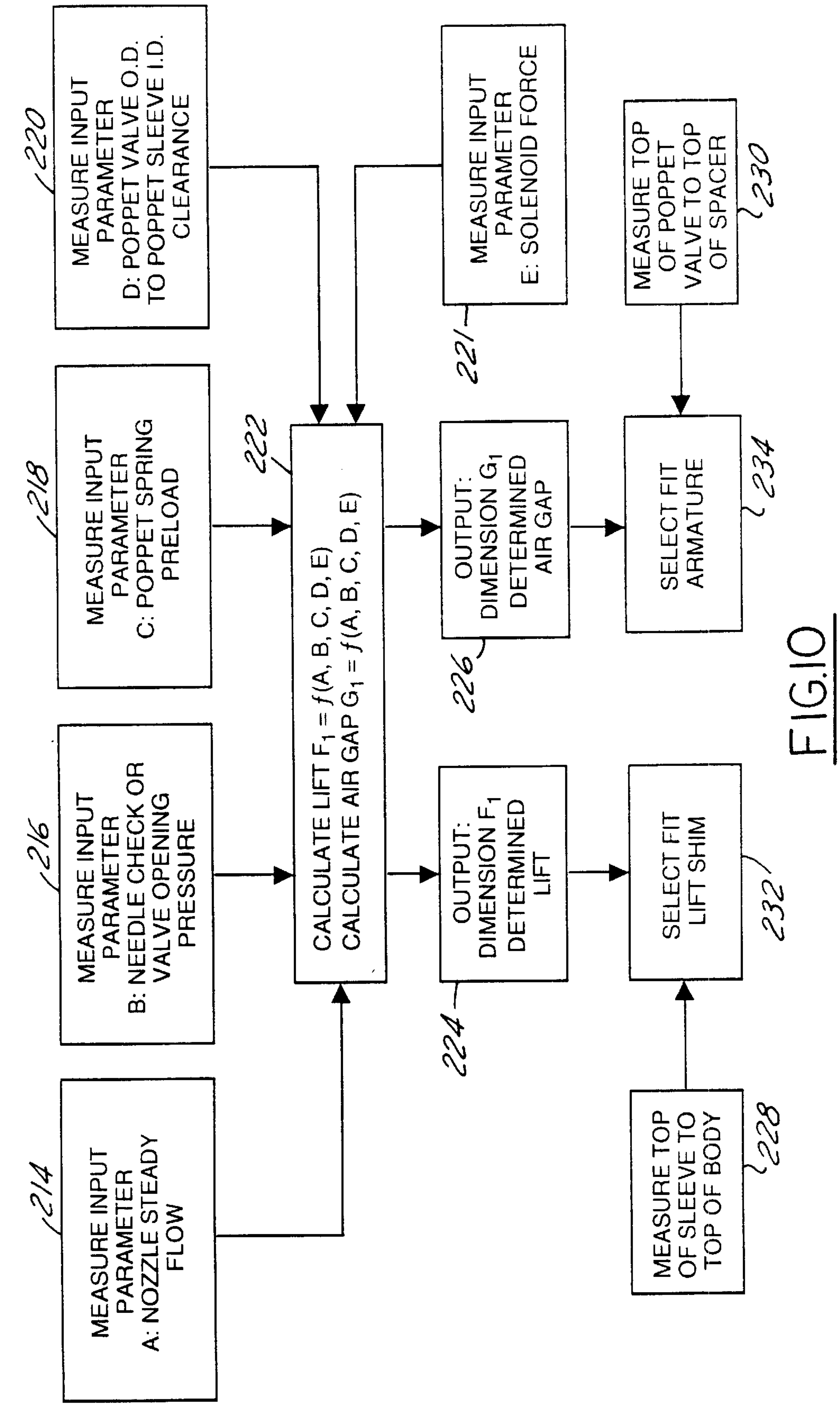
FIG. 10 is a block diagram depicting in further detail an embodiment of the steps of the method of the present invention including measuring input parameters, calculating control parameter values, dimensioning output target dimensions, and selecting components for assembly into the fuel injector shown in FIG. 2.

FIG. 10 shows a block diagram depicting in further detail the select fit method of steps 208 and 210, and particularly the inter-relationship between the tests performed on injector 14 at various stages of assembly to measure the values of the input set of parameters, the calculations involved in determining the values of lift and air gap, and the selection of armature 38 and lift shim 50 to achieve an overall reduced variation in timing and delivery.

In the most preferred embodiment, Steps 214, 216, 218, 220, and 221 depict the five tests performed on injector 14 to measure the values of variables A, B, C, D, and E, respectively. In another preferred embodiment currently employed by the assignee of the application, step 221 (measurement of solenoid force) is omitted. In step 214, nozzle steady flow is measured and assigned to variable A to be used in a further step. Preferably this step is accomplished by first assembling a preselected number of components, for example, case 134, needle check tip 132, needle check or valve 130, sleeve 128, lift spacer 126, needle check spacing 124, stop pin 122 and stop member 120. This partial assembly of injector 14 is then mounted for testing in a test stand and pressurized fluid, preferably fuel, is applied to the partial assembly. The applied pressure is sufficiently great to overcome the bias of needle check spring 124 and thereby unseat normally seated needle check 130 from annular seat 148. Nozzle Steady Flow is then measured and is equal to the flow rate of the test fluid through fuel injection spray orifices 152.

In step 216, needle check or valve 130 opening pressure, hereinafter Valve Opening Pressure or VOP, is measured and assigned to variable B to be used in a further step. Preferably, this step is accomplished by first assembling a preselected number of components, for example, the same components as described in step 214. The partial assembly is then mounted for testing in a test stand where pressurized fluid, preferably fuel, is applied to the partial assembly. The magnitude of the applied pressure is, initially, quite small, but is then increased slowly until the applied pressure is sufficient to unseat needle check or valve 130 from annular seat 148. VOP is preferably determined when a drop in pressure is detected by the test stand, indicating that the test fluid has begun to flow through the plurality of orifices 152 in response to needle check 130 becoming unseated.

In step 218, poppet spring 54 preload or the spring bias of poppet spring 54 is measured and assigned to variable C to be used in a further step. Preferably, the procedure first involves assembly of a preselected number of components (i.e., up to, but not including, assembly of poppet adapter 46 and lift shim 50). Poppet sleeve 52 is then pushed downwardly along longitudinal axis 22, relative to the rest of the partial assembly, to place poppet spring 154 in compression. This downward displacement of poppet sleeve 52 is continued until annular lower seat 88 of poppet valve 34 abuts annular seat 102 of body 56, and annular upper seat 86 of poppet valve 34 abuts annular seat 78 of poppet sleeve 52. Poppet sleeve 52 is then moved upwardly, along longitudinal axis 22, relative to the rest of the partial assembly, a distance equal to a preselected nominal poppet lift, which in the embodiment shown is preferably about 0.250 millimeters (approximately 0.0098425 inches). The value of the bias force exerted by poppet spring 154 is then measured.

In step 220, the poppet valve 34 outside diameter to poppet sleeve 52 inside diameter is measured and assigned to variable D to be used in a further step. Preferably, the procedure first involves measuring the outside diameter of annular peripheral surface 82 of poppet valve 34. Next, the inside diameter of poppet sleeve 52 (i.e., the diameter of main bore 74 of poppet sleeve 52) is measured. An arithmetic operation then determines the poppet-to-sleeve clearance dimension between the above-mentioned two component surfaces.

In step 221, the force developed by stator 36 of solenoid assembly 32 is measured and assigned to variable E to be used in a further step. Preferably, the stator 36 is mounted to a test fixture provided with a test armature secured to a force or load sensor means. The resulting air gap is held constant so that force variations due to the electrical characteristics of the coil/stator 36 are measured independent of any force variations due to fluctuations in the air gap. A test current is then applied to the solenoid assembly and the resulting force applied to the armature is measured and recorded.

In step 222, a target lift dimension and a target air gap dimension are determined using the measured input parameter values A, B, C, D, and E, from steps 214,216, 218, 220 and 221 using the above derived equations for lift and air gap. This calculation step determines the control parameter values such that cumulative variation parameters DEL and SOI are compensated so that an end of assembly line or completed assembly variation of timing and delivery is reduced or eliminated.

In steps 224 and 226, lift and air gap are, respectively, output from calculation step 222 for use in further steps of the method of assembly of the present invention.

In step 228, a test is performed on injector 14 to measure the dimension from the top of annular shoulder 80 of poppet sleeve 52 to the top of body 56.

In step 230, a test is performed on injector 14 to measure the dimension from the top of poppet valve 34 to the top of assembled annular armature spacer 44, taken along longitudinal axis 22.

In step 232, lift shim 50 is chosen by the select fit method of the present invention. Step 232 uses two parameters to effect selection. A first parameter, the calculated lift dimension from step 224, is subtracted from a second parameter, the measured dimension from the top of sleeve 52 to the top of body 56 from step 228, to arrive at the axial desired thickness of poppet lift shim 50. In the preferred embodiment, once the desired dimension is calculated, a lift shim having an actual dimension substantially equal to the desired dimension is selected for assembly into injector 14 in accordance with step 212, as shown in FIG. 8. Preferably, this selection is carried out by select fit (i.e., selecting a component with the desired dimension); however, the selection of the part may include in-line machining of the component to the desired dimension, or otherwise manufacturing the component to the desired dimension.

In step 234, armature 38 is chosen by the select fit process of the present invention. Two parameters are used to effect selection. A first parameter, the calculated air gap dimension from step 226, is subtracted from a second parameter, the measured dimension from the top of poppet valve 34 to the top of spacer 44 from step 230, to arrive at the desired axial thickness of movable armature 38. Again, preferably, an armature having an actual dimension substantially equal to the desired dimension is selected for assembly into injector 14 as shown in step 212 of FIG. 8. As with the lift shim 50, armature 38 is preferably chosen by select fit. However, any other type of selection or in-line fabrication falls with the scope and spirit of this invention.

It will be understood that the timing and delivery variation of the completely assembled final injector from the target timing and delivery parameters is a function of several variables; e.g., the tolerance associated with the measurement of input parameters A, B, C, and D, the tolerance associated with measuring instruments used to determine the actual dimensions of the selected component, and, importantly, tolerances associated with the instruments used to measure the observed timing and delivery performance parameter values of injector 14.

While the method of the present invention was illustrated and described with respect to assembling a fuel injector 14, the method may also be applied to assembling other apparatus or devices, including other types of injectors. Further, the parameters of interest may be broader than performance parameters (i.e., how the apparatus performs or operates), and may include any resultant parameter (i.e., any aspect of interest) of an assembled apparatus.

Other aspects, objects, and advantages of this invention can be obtained from a study of the drawings, the disclosure, and the appended claims.

What is claimed is:

1. A method of assembling a fuel injector having a plurality of components wherein each one of the components has an actual characteristic, the injector being of the type including a set of input parameters, a set of control parameters, and a set of observed performance parameters, each parameter in the set of control parameters being associated with at least one of the components, the value of at least certain of each observed performance parameter varying in relation to a change in the value of each control parameter, comprising the steps of:

measuring the values of the set of input parameters;

determining the values of the set of control parameters using said set of input parameter values such that a completed assembly variation of a set of observed performance parameter values from a respective parameter in a set of predetermined target performance parameter values is reduced;

selecting, for each of the control parameters, the component associated therewith using the respective control parameter value determined in the step of determining the values of the set of control parameters; and, assembling the fuel injector by associating each selected component with the nonselected ones of said plurality of components.

2. The method of claim 1, wherein the set of input parameters comprises nozzle steady flow, the set of control parameters comprises poppet lift and air gap.

3. The method of claim 1, wherein the step of determining the values of the set of control parameters is performed by the substeps of:

assembling a preselected number of the plurality of components (202) into a subassembly of the injector (14) wherein said preselected number is less than the number of the plurality of components;

determining, for each observed performance parameter, a respective cumulative variation parameter value using said set of input parameter values wherein each cumulative variation parameter value is a function of a cumulative variation of said respective observed performance parameter value from said respective target performance parameter value for said assembled preselected number of components; and determining the values of the set of control parameters as a function of said cumulative variation parameter values to compensate for said cumulative variations to thereby reduce said completed assembly variation.

4. The method of claim 3, wherein the set of observed performance parameters, said set of cumulative variation parameters, and the set of control parameters each has a selected number of elements, and wherein changes in each control parameter value is effective to vary, by a predetermined amount, the value of each observed performance parameter.

5. The method of claim 4, wherein the selected number equals 2.

6. The method of claim 3, wherein the set of input parameters comprises poppet spring preload, valve opening pressure, nozzle steady flow, poppet-to-sleeve clearance, and solenoid force, the set of control parameters comprises poppet lift, and air gap wherein the respective associated component comprises a poppet lift shim (50) and an armature (38), said set of target performance parameters and observed performance parameters each comprise timing and delivery.

7. The method of claim 6, wherein a poppet lift control parameter value is computed according to the following equation:

$$R_L=((T_{AG})(DEL)-(k_{AG})(SOI))/((T_L)(k_{AG})-(T_{AG})(k_L))$$

where:

$R_L$=said poppet lift control parameter value;

DEL=a delivery cumulative variation parameter value;

SOI=a timing cumulative variation parameter value;

$T_L$=a first sensitivity parameter defining an incremental variation of said timing observed performance parameter value to changes in a poppet lift control parameter value;

$k_L$=a second sensitivity parameter defining an incremental variation of said delivery observed performance parameter value to changes in a poppet lift control parameter value;

$T_{AG}$=a third sensitivity parameter defining an incremental variation of said timing observed performance parameter value to changes in an armature air gap control parameter value; and $k_{AG}$=a fourth sensitivity parameter defining an incremental variation of said delivery observed performance parameter value to changes in an armature air gap control parameter value.

8. The method of claim 7, wherein said armature air gap control parameter value is computed according to the following equation:

$$R_{AG}=((k_L)(SOI)-(T_L)(DEL))/((T_L)(k_{AG})-(T_{AG})(k_L))$$

where:

$R_{AG}$=said armature air gap control parameter value;

DEL=said delivery cumulative variation parameter value;

SOI=said timing cumulative variation parameter value;

$T_L$=said first sensitivity parameter defining an incremental variation of said timing observed performance parameter value to changes in said poppet lift control parameter value;

$k_L$=said second sensitivity parameter defining an incremental variation of said delivery observed performance parameter value to changes in said poppet lift control parameter value;

$T_{AG}$=said third sensitivity parameter defining an incremental variation of said timing observed performance parameter value to changes in said armature air gap control parameter value; and $k_{AG}$=said fourth sensitivity parameter defining an incremental variation of said delivery observed performance parameter value to changes in said armature air gap control parameter value.

9. The method of claim 1, wherein the step of selecting, for each of the control parameters, the components associated therewith is performed by the substeps of:

determining, for the component associated with each control parameter in the set of control parameters, a desired characteristic wherein said desired characteristic is a function of said respective control parameter values; and selecting (232, 234), for each of the control parameters, the component associated therewith, the respective component to be selected having an actual characteristic that is substantially similar to said respective desired characteristic.

10. The method of claim 9, wherein each one of the plurality of component comprises a respective plurality of attributes, the control parameters in the set of control parameters being selected as a function of said plurality of attributes.

11. The method of claim 10, wherein said plurality of attributes comprises a proximity to the end of said method of assembling the fuel injector.

12. The method of claim 11, wherein said proximity is relatively near the end of said method of assembling the fuel injector.

13. The method of claim 10, wherein each one of the plurality of components has a nominal characteristic, said plurality of attributes further comprising a relative change in any of said observed performance parameters in response to a change in the actual characteristic of the component departing from said nominal characteristic.

14. The method of claim 10, wherein the fuel injector (14) is a hydraulically-actuated electronically controlled fuel injector and the set of input parameters comprises poppet spring preload, valve opening pressure, nozzle steady flow, poppet-to-sleeve clearance, and solenoid force, the set of control parameters comprises poppet lift and air gap wherein the respective associated component comprises a poppet lift shim (50) and an armature (38), said set of target performance parameters and observed performance parameters each comprise timing and delivery.

15. The method of claim 1, wherein said method of assembly affects only the performance parameters in the set of observed performance parameters.

16. The method of claim 1, wherein each of the input parameters is independent of every other input parameter.

17. The method of claim 1, wherein each control parameter has one component associated therewith.

18. A method of assembling an electronically-controlled fuel injector having a plurality of components wherein each component has an actual dimension, the injector being of the type including a set of input parameters comprising nozzle steady flow, a set of control parameters, and a set of observed performance parameters comprising timing and delivery, each control parameter being associated with one component, comprising the steps of:

assembling a preselected number of the plurality of components into the injector wherein said preselected number is less than the number of said plurality of components;

measuring the values of the set of input parameters, including nozzle steady flow;

determining, for both timing and delivery observed performance parameters, the values of a corresponding set of cumulative variation parameters comprising a cumulative timing variation parameter and a cumulative delivery variation parameter using said nozzle steady flow parameter value wherein said cumulative timing and delivery variation parameters values are respectively substantially equal to a cumulative variation of a timing and delivery observed performance parameter values from timing and delivery performance parameter values in a set of predetermined target performance parameters for said assembled preselected number of components;

determining the values of the set of control parameters as a function of said cumulative timing and delivery variation parameter values to compensate for said cumulative timing and delivery variation such that a completed assembly variation of observed timing and delivery performance parameter values from said target timing and delivery performance parameter values is reduced;

selecting, for each control parameter, the one component associated therewith, the respective actual dimension being substantially equal to a respective desired dimension wherein said respective desired dimension is a function of said respective control parameter value; and, assembling the fuel injector by associating each selected component with nonselected ones of said plurality of components.

19. The method of claim 18, wherein the set of control parameters comprises poppet lift and air gap wherein the respective associated component comprises a poppet lift shim and an armature.

20. A method of assembling an electronically-controlled fuel injector having a plurality of components, each component having an actual dimension, the injector being of the type including a preselected set of observed performance parameters, a plurality of features wherein changes in the value of each feature are effective to vary, by a predetermined amount, the value of each observed performance parameter, each feature having a preselected set of components associated therewith, changes in the actual dimension of each component being effective to vary the value of the associated feature, comprising the steps of:

identifying control parameters from the plurality of features for which said respective predetermined amounts are relatively large such that a set of observed performance parameter values are varied by relatively large amounts by varying a set of identified control parameter values;

selecting, for each of said identified control parameters, components from said respectively associated sets of components whose actual dimension is sufficient to reduce, via a change in the value of the respective control parameter, an end of line variation of said observed performance parameter values from a respective parameter in a set of predetermined target performance parameter values; and assembling the fuel injector by associating said selected components with nonselected ones of said plurality of components.

21. The method of claim 20, further comprising the step of identifying, for each one of the plurality of features, components in the respectively associated set of components that are assembled into the fuel injector (14) relatively near the end of said method of assembly (200), and wherein the step of identifying control parameters includes the further steps of:

designating features whose associated set of components contain one of said identified components as a member; and identifying, from features identified in the step of identifying control parameters as identified control parameters, those features that have also been designated in said designating step.

22. The method of claim 20, wherein the step of selecting, for each of said identified control parameters components, is performed by the substeps of:

assembling a preselected number of components into the injector (202) wherein said preselected number is less than the number of the plurality of components;

performing tests on the fuel injector (214, 216, 218, 220) to measure the values of the set of input parameters;

determining, for each observed performance parameter, a respective cumulative variation parameter value using said set of input parameter values wherein each cumulative variation parameter value is substantially equal to a cumulative variation of said respective observed performance parameter value from said respective target performance parameter value for said assembled preselected number of components;

determining the values of the set of control parameters (222) as a function of said cumulative variation parameter values to compensate for said respective cumulative variations to thereby reduce said completed assembly variation; and selecting, for each of the control parameters, the component associated therewith (232, 234), the respective component to be selected having an actual dimension that is substantially equal to a respective desired dimension wherein said respective desired dimension is a function of said respective control parameter value.

23. The method of claim 21, wherein the set of input parameters comprises poppet spring preload, valve opening pressure, nozzle steady flow, poppet-to-sleeve clearance, and solenoid force, said identified control parameters comprises poppet lift and air gap, said set of preselected components associated with said poppet lift comprises a poppet lift shim (50), said set of preselected components associated with said air gap comprises an armature (38), said set of target performance parameters and observed performance parameters each comprise timing and delivery.

24. The method of claim 22, wherein the set of input parameters comprises poppet spring preload, valve opening pressure, nozzle steady flow, poppet-to-sleeve clearance, and solenoid force, said identified control parameters comprises poppet lift and air gap, said set of preselected components associated with said poppet lift comprises a poppet lift shim (50), said set of preselected components associated with said air gap comprises an armature (38), said set of target performance parameters and observed performance parameters each comprise timing and delivery.

25. A method for assembling fuel injector of the type including a set of input parameters, and a set of control parameters, comprising steps of:

determining the values of a set of cumulative variation parameters using a set of input parameters;

determining the value of each control parameter as a function of the set of determined cumulative variation parameter values and a set of target performance parameters such that a completed assembly of the fuel injector achieves the target performance parameters; and assembling the fuel injector such that each control parameter of the fuel injector has a value substantially equal to a respective determined control parameter value.

26. The method of claim 25 wherein said fuel injector comprises a plurality of components wherein each one of the components has an actual characteristic, and each control parameter is associated with at least one of the components, and wherein said assembling step includes the substeps of:

determining, for the component associated with each control parameter in the set of control parameters, a desired characteristic wherein said desired characteristic is a function of said control parameter values; and selecting, for each of the control parameters, the component associated therewith, the respective component to be selected having an actual characteristic that is substantially similar to said respective desired characteristic.

27. A method of assembling an apparatus having a plurality of components wherein each one of the components has an actual characteristic, the apparatus being of the type including a set of input parameters, a set of control parameters, and a set of observed resultant parameters, each parameter in the set of control parameters being associated with at least one of the components, the value of at least certain of each observed resultant parameter varying in relation to a change in the value of each control parameter, comprising the steps of:

measuring the values of the set of input parameters;

determining the values of the set of control parameters using said set of input parameter values such that a completed assembly variation of a set of observed resultant parameter values from a respective parameter in a set of predetermined target resultant parameter values is reduced;

selecting, for each of the control parameters, the component associated therewith using the respective control parameter value determined in the step of determining the values of the set of control parameters and, assembling the apparatus by associating each selected component with the unselected ones of the plurality of components.

28. The method of claim 27, wherein the step of determining the values of the set of control parameters is performed by the sub-steps of:

assembling a preselected number of the components (202) into a sub-assembly of the apparatus wherein said preselected number is less than the number of components in a completed assembly of the apparatus;

determining, for each observed resultant parameter, a respective cumulative variation parameter value using said set of input parameter values wherein each cumulative variation parameter value is a function of a cumulative variation of said respective observed resultant parameter value from said respective target resultant parameter value for said assembled preselected number of components; and determining the values of the set of control parameters as a function of said cumulative variation parameter values to compensate for said cumulative variations to thereby reduce said completed assembly variation.

29. The method of claim 28, wherein the set of observed resultant parameters, the set of cumulative variation parameters, and the set of control parameters each has N elements, where N is an integer greater than zero, and wherein changes in each control parameter value is effective to vary, by a predetermined amount, the value of each observed resultant parameter.

30. The method of claim 29, wherein each of the N resultant parameters has an associated equation in N control parameters, said control parameters being defined when the N equations are solved simultaneously.

31. The method of claim 27, wherein the step of selecting, for each of the control parameters, the components associated therewith is performed by the sub-steps of:

determining, for the component associated with each control parameter in the set of control parameters, a desired characteristic wherein said desired characteristic is a function of said respective control parameter value; and selecting (232, 234), for each of the control parameters, the components associated therewith, the respective component to be selected having an actual characteristic that is substantially similar to said respective desired characteristic.

32. The method of claim 31, wherein each one of the plurality of components comprises a respective plurality of attributes, the control parameters in the set of control parameters being selected as a function of said plurality of attributes.

33. The method of claim 32, wherein said plurality of attributes comprises a proximity to the end of said method of assembling the apparatus, said proximity being relatively near the end of said method of assembling the apparatus.

34. The method of claim 32, wherein each one of the plurality of components has a nominal characteristic, said plurality of attributes further comprising a relative change in any of said observed resultant parameters in response to a change in the actual characteristics of the component departing from said nominal characteristic.

35. The method of claim 27, wherein said method of assembly affects only the resultant parameters in the set of observed resultant parameters.

36. The method of claim 27, wherein each of the input parameters is independent of every other input parameter.

* * * * *